Nov. 20, 1951  E. M. NAVARRO  2,575,971
MILK BOTTLE HOLDER
Filed Feb. 25, 1947
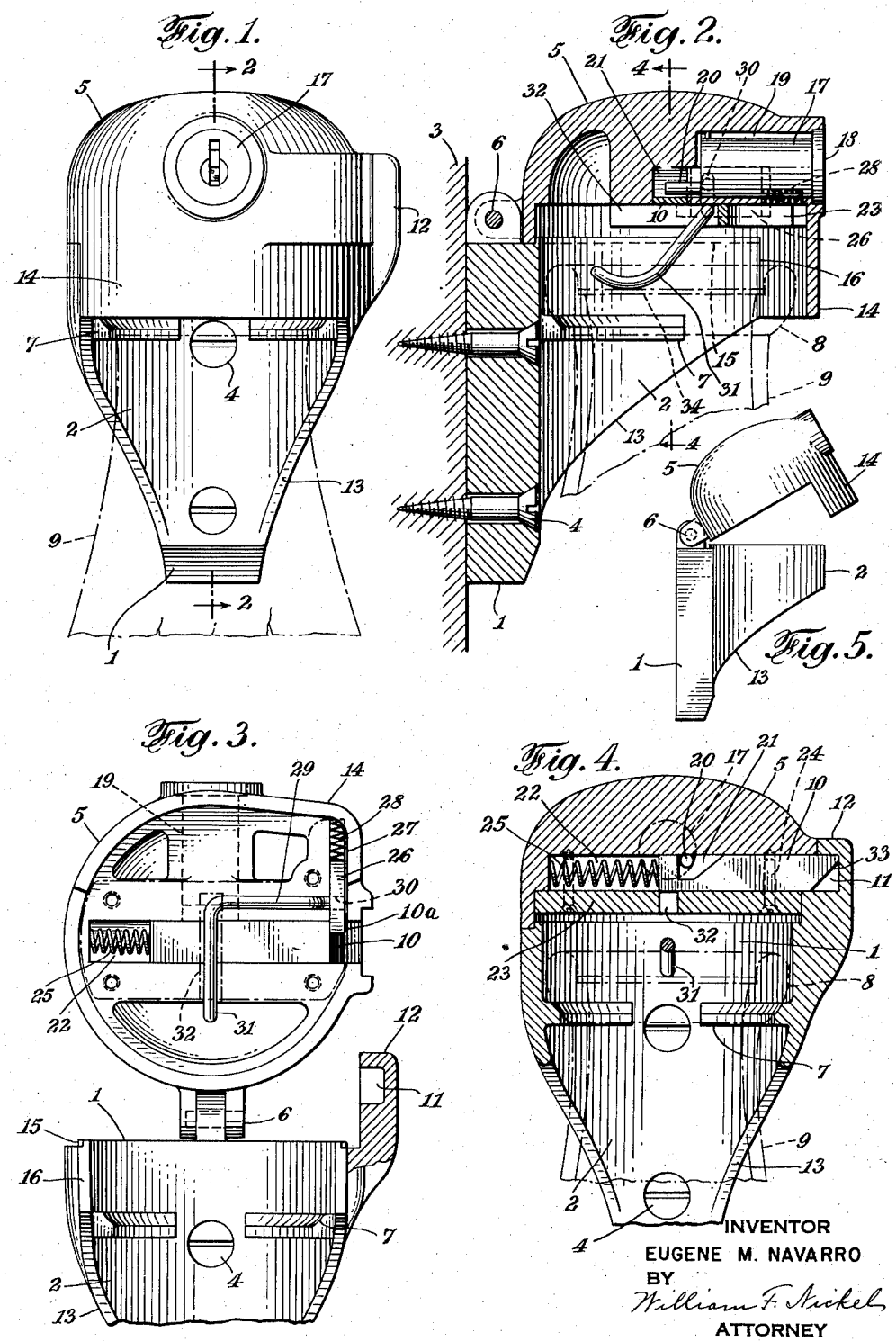
INVENTOR
EUGENE M. NAVARRO
BY
William F. Nickel
ATTORNEY Patented Nov. 20, 1951

2,575,971

UNITED STATES PATENT OFFICE 2,575,971

MILK BOTTLE HOLDER

Eugene M. Navarro, New York, N. Y.

Application February 25, 1947, Serial No. 730,763

1 Claim. (Cl. 232—41.5)

My invention is an improvement in holders, and especially a holder in which full bottles of milk are deposited and locked for delivery to the buyer, at the latter's place of occupancy; and replaced when empty for return to the distributor or dealer.

The principal object of the invention is to provide a milk bottle holder adapted to be mounted on the exterior of a dwelling or apartment to receive a bottle of milk; said holder being designed to prevent theft of the bottle before the occupant takes possession of it; by means of a construction embracing a movable cap which serves the immediate purpose of securing the bottle in the holder and which carries a bolt with locking and controlling means to make the cap fast whenever the milkman deposits a full bottle with a closure or seal and moves the cap to closed position, in which the proper key is required to release the cap before the bottle can be removed.

The holder is so constructed that the locking can be effected only when a full sealed bottle is placed therein. Under other conditions locking cannot be done, and an empty bottle can be freely supported in the holder to be taken by the milkman without a key whenever the customer has an empty bottle to be returned to the producer.

The objects and advantages are fully explained in the following specification, which shows and describes a preferred combination and arrangement of parts, the essential features of which are pointed out in the appended claim.

In the drawings,

Figure 1 is a front view of my improved milk bottle holder and lock, the holder being closed.

Figure 2 is a section on line 2—2 of Figure 1, showing a sealed bottle therein.

Figure 3 is a vertical cross section with the parts in position to receive a bottle.

Figure 4 is a section on line 4—4 of Figure 2, and

Figure 5 is a side view showing the holder open.

The numeral 1 indicates the body of the holder, with a part to serve as a bracket having a rear flat face adapted to fit against the outer flat side of a door, wall or the like; and a pair of outspread supporting arms 2, curved to fit a milk bottle around the top thereof. The body is secured to a door or wall 3 by screws or other fastening devices 4. The holder includes a top or cap 5 connected to the body by a hinge 6. The body is open at the front between ends of the arms 2, and on the inner sides of the arms are curved ribs 7, from which a milk bottle can be suspended in the holder by engagement of these ribs with the lower side of the expanded rim 8. The bottle is secured in the holder by elements comprising a bolt 10, that is moved to carry its outer end into a recess 11 in a projection 12, rising from the outer side of one of the arms 2. The upper edges of the arms are level to be engaged by the cap 5, while the lower edges 13 slope downward toward the wall 3 to make the arms strong enough to serve their purpose. The top or lid 5 has a downward extending arc-shaped projection 14 on its front edge to enter the space between the ends of the arms 2, and lie close to the rim 8 of the bottle 9. The upper edges of the arms 2 have a shoulder 15 to allow the cap to fit down neatly on the arms 2. When the cap 5 is down, the rim of the bottle is completely encircled and the retention of the bottle fully assured. The ends of the projection 14 then completely bridge the gap between the ends 16 of the arms 2.

The bolt 10 is retracted by a lock barrel 17 having a flange 18 at its outer end to fit a shoulder at the entrance to an open cylindrical recess 19 extending horizontally into the cap 5 from the front, just above the projection 14. A stud 20 extends from the inner end of the barrel 17, and when the latter is rotated by a key, the bolt 10 is withdrawn. The bolt 10 has a recess 21 to receive the stud 20, and the bolt 10 slides in a channel extending along the inner face of the cap 5, this channel being closed by a plate 23 affixed to the cap in any suitable way as by one or more screws 24. The bolt, when free, is projected by the spring 25 in the channel 22 into the recess 11. It is bevelled on the lower face at its outer end.

Carried by the cap 5, on the under face, is a catch or stop 26, mounted to slide in a groove 27, extending transversely of the channel 22, and communicating therewith. In this groove is a spring 28 between the catch 26 and the closed end of the groove 27 in the cap 5. The catch is actuated against the spring 28 by a member 29 having a crank 30 at one end fitting into an opening in the stop 26. The groove 27 is at one side of the projection 14 of the cap and the adjacent edge of the plate 23 is shaped to give clearance to the catch. The member 29 is made of a metal rod or wire, and near the middle of the cap it has an arm 31 bent at a right angle, and downward at obtuse angle to the plane of the crank 30. See Figure 2. The plate 23 has a slot on its inner face, parallel to the bolt 10, to receive the part of the member 29 in line with the crank, and a slot 32 connecting with said groove to allow movement of the arm 31.

With the parts in the position shown in Figure 3, suppose an empty milk bottle is put into the holder to be taken back by the milkman and replaced by a full sealed bottle of milk. The cover or cap 5 is raised and the neck of the empty bottle is inserted between the arms 2, whereupon the exterior bead of the rim 8 of the bottle 9 rests upon the ribs 7. The cap 5 is now lowered and the bevelled front end of the bolt 10 will press down on the projection 12. Thus the bolt 10 is forced back to retracted position in the channel 22. The catch 26 is moved into a notch in the bolt by its spring 27, and the arm 31 hangs down into the mouth of the bottle 9, because the mouth has no closure but is fully open. The space between the outer ends of the arms 2 is closed by the depending flange 14 of the cap 5 and cooperates with the ribs 7; but the empty bottle can be removed because the cap is free to be lifted while the catch 26 obstructs the bolt 10 and prevents it from projecting into the recess 11 of the part 12. The end of the bolt is notched, as shown at 10a, to enable the catch 26 to engage it.

Upon the removal of the empty bottle by the milkman, and the substitution of a full and sealed bottle of milk therefor, a different result is obtained. The bottle 9 is shown in Figure 2 with a disk closure 34 resting on a shoulder in the mouth of the bottle, but a similar action follows if a bonnet or hood closure for the full bottle of milk is utilized.

The neck of the bottle 9 is inserted between the arms 2 after the cap 5 has been raised, and the bottle is suspended as before from the ribs 7 on which the rim of the bottle rests. Upon the closing of the cap 5, the arm 31 of the controlling member 9 strikes the closure 34 of the bottle, and a further downward movement of the cap 5 pushes up the arm 31 and rotates the member 29, so that the crank 30 pushes the catch 26 against the spring 27 out of the path of the bolt 10. Thereupon the end of the bolt 10 is projected into the hollow abutment 12 by the spring 25. The cap 5 is thus secured against upward movement and the bottle of milk cannot be removed except by the use of a key in the lock 17 to withdraw the bolt 10.

The holder has space enough to accommodate the upward displacement of the closure 34 should the contents of the bottle expand by reason of becoming frozen during cold weather.

The invention set forth as above is quite similar to the improvements disclosed in my copending applications Nos. 730,762, now abandoned, and 730,764, now Patent Number 2,549,510, dated April 17, 1951, filed on the same date as this application, for improvements in Milk Bottle Holders; the former case disclosing a construction having a special type of bolt carried by the main support, and the latter another form of construction for the same purpose involving supports for two milk bottles with bolts in the cap, and locking means between the supports. The claims in this case do not define any of the features set forth in the claims of the two copending applications aforesaid.

While I have shown and described what I consider to be the most practical embodiment of my invention, I wish it to be understood that such changes as come within the scope of the appended claim may be resorted to when desired.

Having thus described the invention, what I claim as new and desire to secure by Letters Patent is:

A holder comprising a stationary supporting bracket having a pair of outspread arms, inward projecting ribs on the inner sides of said arms to engage the expanded rim of the neck of a bottle, a closure cap having pivotal connection to said bracket midway between said arms and having an arc-shaped flange filling the space between said arms when the closure is in lowered position, a lock mechanism carried by said cap and including a bolt extending substantially parallel to said pivotal connection, a spring biassing the bolt to operative position to engage the bracket and secure the cap, the cap also carrying a catch, means on the bolt normally cooperating with the catch to retain the bolt in inoperative position, a rotatable actuator member mounted in the cap pivotally connected to the catch and having an arm normally depending below the cap, and a spring in the cap to move the catch to bolt-retaining position, said member being in position to be rotated by the closure at the mouth of the bottle to release said catch and liberate said bolt, the actuator member being mounted to rotate about an axis extending parallel to said pivotal connection.

EUGENE M. NAVARRO.

REFERENCES CITED

The following references are of record in the file of this patent:

UNITED STATES PATENTS

| Number | Name | Date |
|---|---|---|
| 1,079,978 | Dunn | Dec. 2, 1913 |
| 1,534,912 | Bruderlein | Apr. 21, 1925 |
| 2,038,421 | Danna | Apr. 21, 1936 |